(12) United States Patent
Smith (10) Patent No.: US 12,378,990 B2
(45) Date of Patent: Aug. 5, 2025

(54) BALL JOINT ASSEMBLY

(71) Applicant: Synergy Manufacturing, Inc., San Luis Obispo, CA (US)

(72) Inventor: Andrew J. Smith, San Luis Obispo, CA (US)

(73) Assignee: Synergy Manufacturing, Inc., San Luis Obispo, CA (US)

( * ) Notice: Subject to any disclaimer, the term of this patent is extended or adjusted under 35 U.S.C. 154(b) by 339 days.

(21) Appl. No.: 17/965,205

(22) Filed: Oct. 13, 2022

(65) Prior Publication Data

US 2023/0279899 A1 Sep. 7, 2023

Related U.S. Application Data

(62) Division of application No. 16/020,894, filed on Jun. 27, 2018, now Pat. No. 11,473,615.

(51) Int. Cl.
*F16C 11/06* (2006.01)
*B60G 7/00* (2006.01)

(52) U.S. Cl.
CPC ........ *F16C 11/069* (2013.01); *F16C 11/0628* (2013.01); *B60G 7/005* (2013.01)

(58) Field of Classification Search
CPC .............. F16C 11/0619; F16C 11/0623; F16C 11/0628; F16C 11/0685; F16C 11/069; F16C 11/0695; F16C 2326/05; Y10T 403/32729; Y10T 403/32786; Y10T 403/32803; B60G 7/005; B60G 2204/416; F16B 39/10; F16B 39/108; F16B 39/24; F16B 43/00

See application file for complete search history.

(56) References Cited

U.S. PATENT DOCUMENTS

| | | | | |
|---|---|---|---|---|
| 3,090,642 | A * | 5/1963 | Gottschald | F16C 11/0604 403/126 |
| 3,322,445 | A * | 5/1967 | Hassan | F16C 11/0671 277/928 |
| 3,442,561 | A * | 5/1969 | Henry-Biabaud | F16C 11/0628 384/213 |
| 3,497,247 | A * | 2/1970 | Fister | F16C 11/0676 403/133 |
| 3,902,816 | A * | 9/1975 | Moore | F16C 11/0604 403/114 |
| 4,322,175 | A * | 3/1982 | Szczesny | F16C 11/0671 277/635 |

(Continued)

FOREIGN PATENT DOCUMENTS

| | | | |
|---|---|---|---|
| DE | 8107111 U1 * | 8/1981 | .......... F16C 11/0623 |
| GB | 421984 A * | 1/1935 | .......... F16C 11/0619 |

(Continued)

*Primary Examiner* — Amber R Anderson
*Assistant Examiner* — Kevin J Baynes
(74) *Attorney, Agent, or Firm* — Knobbe, Martens, Olson & Bear, LLP (57) ABSTRACT

Adjustable and rebuildable ball joint assemblies are disclosed. Methods for installation, adjustment, and rebuilding ball joint assemblies are described. In some embodiments, the ball joint assembly includes a washer with tabs to restrain rotation of the cap relative to the housing. In some embodiments, the ball joint assembly includes a locking mechanism to restrain rotation of the bearing relative to the housing.

9 Claims, 9 Drawing Sheets

(56) References Cited

U.S. PATENT DOCUMENTS

| | | | | |
|---|---|---|---|---|
| 4,613,250 A | * | 9/1986 | Laucus | F16C 11/0619 29/402.06 |
| 4,819,919 A | * | 4/1989 | Taylor | F16F 9/38 74/18.2 |
| 5,022,875 A | | 6/1991 | Karls | |
| 5,267,805 A | * | 12/1993 | Ueno | F16C 11/069 403/132 |
| 5,318,480 A | * | 6/1994 | Essi | F16J 3/048 464/175 |
| 5,564,853 A | * | 10/1996 | Maughan | F16C 11/069 29/898.047 |
| 5,618,143 A | | 4/1997 | Cronin, II | |
| 5,839,845 A | * | 11/1998 | Kincaid | F16C 11/0647 403/135 |
| 5,967,724 A | | 10/1999 | Terry | |
| 6,010,271 A | | 1/2000 | Jackson et al. | |
| 6,343,889 B1 | | 2/2002 | Hendricks et al. | |
| 6,485,218 B1 | | 11/2002 | Martinovsky | |
| 7,192,214 B2 | * | 3/2007 | Schonhoff | F16J 3/042 403/50 |
| 7,670,078 B2 | * | 3/2010 | Elterman | F16J 3/046 403/50 |
| 7,704,007 B2 | * | 4/2010 | Elterman | F16D 3/845 403/50 |
| 7,753,611 B2 | * | 7/2010 | Ergodan | B62D 7/166 403/138 |
| 8,662,783 B2 | | 3/2014 | Molenaar | |
| 8,764,336 B2 | | 7/2014 | Kraatz | |
| 8,794,860 B1 | * | 8/2014 | McGean | F16C 11/0642 403/137 |
| 9,291,195 B1 | | 3/2016 | Parker et al. | |
| 9,416,518 B2 | * | 8/2016 | Ditzler | F16C 11/069 |
| 9,771,971 B1 | * | 9/2017 | Winter | F16C 11/0685 |
| 9,982,711 B1 | * | 5/2018 | Henriksen | F16C 11/0642 |
| 10,527,087 B2 | * | 1/2020 | Sugg | F16C 11/0633 |
| 10,527,088 B2 | * | 1/2020 | Hosen | F16C 11/0671 |
| 2003/0223806 A1 | | 12/2003 | De Freitas | |
| 2006/0182491 A1 | * | 8/2006 | Bernhardt | F16J 3/042 403/134 |
| 2008/0019766 A1 | * | 1/2008 | Flaim | F16C 11/0676 403/122 |
| 2009/0238636 A1 | * | 9/2009 | Howe | F16C 11/069 403/127 |
| 2012/0093573 A1 | | 4/2012 | Molenaar | |
| 2012/0282014 A1 | | 11/2012 | Ersoy | |
| 2013/0121756 A1 | | 5/2013 | Mevorach | |
| 2014/0086667 A1 | | 3/2014 | Elterman | |
| 2014/0205366 A1 | | 7/2014 | Mevorach | |
| 2014/0212205 A1 | | 7/2014 | Forthaus | |
| 2015/0275955 A1 | | 10/2015 | Ekmedzic | |
| 2016/0258481 A1 | | 9/2016 | Kraatz | |
| 2016/0273578 A1 | * | 9/2016 | Yanagi | F16C 11/0671 |
| 2020/0277984 A1 | * | 9/2020 | Kanagawa | F16J 3/04 |

FOREIGN PATENT DOCUMENTS

| | | | | |
|---|---|---|---|---|
| GB | 1233906 A | * | 6/1971 | F16C 11/068 |
| WO | WO-2006019145 A1 | * | 2/2006 | F16C 11/069 |

\* cited by examiner

BALL JOINT ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. The present application is a continuation of U.S. application Ser. No. 16/020,894, entitled "BALL JOINT ASSEMBLY," filed Jun. 27, 2018, which is incorporated herein by reference in its entirety.

BACKGROUND

Field

Features for ball joints are described. More specifically, features for adjustable and rebuildable ball joints.

Description of the Related Art

Ball joints are commonly used as the pivot between the wheels and the suspension of a vehicle. On modern vehicles, ball joints are typically used in the front suspension, but they can also be used in the rear suspension. In some suspensions, there will be one ball joint used per side. In other suspensions, there are two ball joints used per side, including an upper ball joint and a lower ball joint. Ball joints may also be used in trailer hitches.

Ball joints used in these applications are subjected to various operating conditions and may be required to carry substantial loads. When wear develops the performance of the ball joint degrades and may result in less precise steering or excessive looseness and play in the vehicle suspension system. It may also affect the quality of the ride and comfort of the passengers and cause premature tire wear. It is desirable to address these drawbacks with typical ball joints.

SUMMARY

The embodiments disclosed herein each have several aspects no single one of which is solely responsible for the disclosure's desirable attributes. Without limiting the scope of this disclosure, its more prominent features will not be briefly discussed. After considering this discussion, and particularly after reading the section entitled "Detailed Description," one will understand how the features of the embodiments described herein provide advantages over existing systems, devices, and methods.

The following disclosure describes non-limiting examples of some embodiments. For instance, other embodiments of the disclosed systems and methods may or may not include the features described herein. Moreover, disclosed advantages and benefits can apply only to certain embodiments of the invention and should not be used to limit the disclosure.

Systems, devices, and method for an adjustable and/or rebuildable ball joint assembly are described.

In one aspect described herein a ball joint assembly comprises a housing defining a cavity and a longitudinal axis, the housing comprising a distal end and a proximal end, the distal end comprising an opening; a bearing configured to be positioned at the proximal end of the housing; an elongated ball stud extending axially from a distal end to a proximal end, the proximal end having a rounded ball end configured to be received into the cavity of the housing and to be rotatably supported with at least a portion of the elongated ball stud located distal to the bearing; a washer having a body defining an opening, the opening of the washer configured to fit over the elongated ball stud to position the body distal to the housing, the washer comprising a first tab and a second tab each extending away from the body, the first tab configured to engage with the housing in a first configuration to prevent rotation of the washer about the longitudinal axis relative to the housing; and a cap having a body defining an opening, the opening of the cap configured to fit over the elongated ball stud and engage with the housing with at least a portion of the cap located distal to the washer. The second tab of the washer is moveable between a first configuration, wherein the second tab engages with the cap to prevent rotation of the cap about the longitudinal axis relative to the washer, and a second configuration, wherein the second tab does not prevent rotation of the cap about the longitudinal axis relative to the washer.

In some embodiments, the first tab is moveable between the first configuration and a second configuration, wherein the first tab does not prevent rotation of the washer about the longitudinal axis relative to the housing.

In some embodiments, the opening at the distal end of the housing is configured to receive the rounded ball end therethrough in a proximal direction. In some embodiments, the proximal end of the housing comprises an end wall.

In some embodiments, the ball joint assembly further comprises a boot configured to fit over the elongated ball stud.

In some embodiments, the housing is configured to press fit with a vehicle component.

In some embodiments, the bearing comprises a bearing insert.

In some embodiments, the ball joint assembly further comprises a compression spring configured to be positioned proximal to the bearing.

In some embodiments, the cap comprises at least one slot configured to engage the second tab of the washer in the first configuration.

In another aspect described herein a ball joint assembly comprises a housing defining a cavity and a longitudinal axis, the housing comprising a distal end and a proximal end, the distal end comprising an opening; a bearing configured to be positioned in the cavity, the bearing comprising a proximal portion and distal portion, the proximal portion configured to be positioned at the proximal end of the housing, and the distal portion configured to rotate about the longitudinal axis relative to the proximal portion; a pin configured to engage the housing and the proximal portion of the bearing to prevent rotation of the proximal portion about the longitudinal axis relative to the housing; an elongated ball stud extending axially from a distal end to a proximal end, the proximal end having a rounded ball end configured to be received into the cavity of the housing and to be rotatably supported by the distal portion of the bearing with at least a portion of the elongated ball stud located distal to the bearing; and a cap having a body defining an opening, the opening configured to fit over the elongated ball stud and engage with the housing.

In some embodiments, the opening of the distal end of the housing is configured to receive the rounded ball end therethrough in a proximal direction.

In some embodiments, the cap is adjustable to increase or decrease a compressive force on the bearing.

In some embodiments, the ball joint assembly further comprises a washer having a first tab and a second tab, the first tab moveable between first and second configurations, the second tab moveable between first and second configurations. The first tab in the first configuration engages with the housing to prevent rotation of the washer about the longitudinal axis relative to the housing, and the second tab in the first configuration engages with the cap to prevent rotation of the cap about the longitudinal axis relative to the washer.

In another aspect described herein a method of installing a lower ball joint assembly into a vehicle comprises positioning a housing into a component of the vehicle, the housing defining a cavity and a longitudinal axis and comprising a distal end and a proximal end, the distal end comprising an opening; positioning a bearing in the cavity of the housing; advancing a ball stud proximally into the cavity of the housing such that the bearing rotatably supports the ball stud; positioning a cap over the elongated ball stud and engaging the cap with the housing; and restraining rotation of the cap relative to the housing.

In some embodiments, positioning the housing into the component of the vehicle comprises press fitting the housing into the component of the vehicle.

In some embodiments, the method of installing a lower ball joint assembly into a vehicle further comprises restraining rotation of a proximal portion of the bearing relative to the housing.

In some embodiments, restraining rotation of the proximal portion of the bearing comprises engaging a pin with the housing and the proximal portion of the bearing.

In some embodiments, restraining rotation of the cap comprises positioning a washer distal to the housing and proximal to the cap, the washer comprising a first tab and a second tab; adjusting the first tab of the washer to rotationally restrain the washer relative to the housing; and adjusting the second tab of the washer to rotationally restrain the washer relative to the cap.

In some embodiments, the method of installing a lower ball joint assembly into a vehicle further comprises positioning a boot distal to the cap, the boot configured to fit over the ball stud.

In some embodiments, the method of installing a lower ball joint assembly into a vehicle further comprises adjusting a compressive force on the bearing.

In some embodiments, adjusting the compressive force on the bearing comprises rotating the cap in a first direction to increase the compressive force on the bearing and rotating the cap in a second direction to decrease the compressive force on the bearing.

In another aspect described herein a method of rebuilding a ball joint assembly having a housing engaged with a vehicle component comprises positioning a washer and a cap over a ball stud at a distal end of the housing; rotating the cap to increase a compressive force on the ball stud; adjusting a first tab of the washer to rotationally restrain the washer relative to the housing; and adjusting a second tab of the washer to rotationally restrain the washer relative to the cap.

In some embodiments, the method of rebuilding a ball joint assembly having a housing engaged with a vehicle component further comprises advancing the ball stud in a proximal direction into the housing prior to positioning the washer and the cap over the ball stud.

In some embodiments, the method of rebuilding a ball joint assembly having a housing engaged with a vehicle component further comprises advancing the ball stud in a distal direction out of the housing prior to advancing the ball stud in the proximal direction into the housing.

In some embodiments, the method of rebuilding a ball joint assembly having a housing engaged with a vehicle component further comprises removing a first bearing in a distal direction out of the housing prior to positioning the washer and the cap over the ball stud.

In some embodiments, the method of rebuilding a ball joint assembly having a housing engaged with a vehicle component further comprises advancing a second bearing in a proximal direction into the housing after removing the first bearing and prior to positioning the washer and the cap over the ball stud.

In some embodiments, the method of rebuilding a ball joint assembly having a housing engaged with a vehicle component further comprising, prior to positioning the washer and the cap over the ball stud at the distal end of the housing, disengaging the cap from the distal end of the housing; advancing the ball stud in a distal direction out of the housing; removing a first bearing in a distal direction out of the housing; advancing a second bearing in a proximal direction into the housing; and advancing the ball stud in a proximal direction into the housing.

In some embodiments, the vehicle component comprises a steering knuckle, an axle housing, or a control arm.

In some embodiments, the method of rebuilding a ball joint assembly having a housing engaged with a vehicle component further comprises engaging a pin with the housing and a proximal portion of the second bearing to prevent rotation of the proximal portion of the second bearing relative to the housing.

In some embodiments, adjusting the first tab of the washer comprises bending the first tab in a proximal direction. In some embodiments, adjusting the second tab of the washer comprises bending the first tab in a distal direction.

In some embodiments, the method of rebuilding a ball joint assembly having a housing engaged with a vehicle component further comprises disengaging the cap from the distal end of the housing prior to prior to positioning the washer and the cap over the ball stud at the distal end of the housing. In some embodiments, disengaging the cap from the housing comprises adjusting the first tab of the washer to allow rotation of the washer relative to the housing. In some embodiments, adjusting the first tab of the washer comprises bending the first tab to extend radially outward. In some embodiments, disengaging the cap from the housing further comprises adjusting the second tab of the washer to allow rotation of the washer relative to the cap. In some embodiments, adjusting the second tab of the washer comprises bending the second tab to extend radially outward.

In another aspect described herein a ball joint assembly comprises a housing defining a cavity and a longitudinal axis, the housing comprising a distal end and a proximal end, the distal end comprising an opening having a first width; a bearing configured to be positioned at the proximal end of the housing; an elongated ball stud extending axially from a distal end to a proximal end, the proximal end including a rounded ball end having a second width, the rounded ball end configured to be rotatably supported by the bearing. The second width of the rounded ball end is less than the first width of the opening at the distal end of the housing.

In some embodiments, the ball joint assembly further comprises a cap having a body defining an opening, the opening configured to fit over the elongated ball stud, the cap configured to engage with the distal end of the housing.

In some embodiments, the elongated ball stud is configured to be received into the cavity of the housing in a proximal direction through the opening at the distal end of the housing.

In some embodiments, the cap is configured to increase a force on the bearing when tightened and decrease the force on the bearing when loosened.

In some embodiments, the ball joint assembly further comprises a boot configured to fit over the elongated ball stud.

In some embodiments, the cap is configured to engage the boot.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure.

DETAILED DESCRIPTION

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative of one or more embodiments of the invention. An aspect disclosed herein may be implemented independently of any other aspects and that two or more of these aspects may be combined in various ways. For example, an apparatus (e.g., the illustrated embodiments of a ball joint) may be implemented, or a method may be practiced, using any number of the aspects set forth herein. In addition, such an apparatus may be implemented or such a method may be practiced using other structure, functionality, or structure and functionality in addition to, or other than one or more of the aspects set forth herein.

The description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

Rebuildable and/or adjustable ball joint assemblies 10 are disclosed. The ball joint assemblies 10 may be installed in a vehicle, for example, the front steering and suspension systems of a vehicle. Methods of installation, adjustment, and rebuilding of the ball joint assemblies 10 are disclosed. Methods of replacement of parts of the ball joint assemblies 10 are disclosed. As a ball joint assembly is used, the bearing may become worn resulting in looseness and play of the ball joint assembly. This requires adjustment of the ball joint assembly to remove the looseness and play from the ball joint assembly. Eventually, the bearing may become so worn that the ball joint assembly can no longer be adjusted to remove the looseness and the bearing must be removed and replaced with a new one. Other components of the ball joint assembly may become worn or broken and require replacement, for example, the ball stud. Ball joints may be pressed in to the vehicle and as ball joints are continually replaced the press fit can deteriorate over time, eventually requiring very expensive component replacement. The disclosed devices and methods provide the ability to rebuild and adjust the ball joint assembly 10 while it is on the vehicle. The disclosed ball joint assemblies 10 and methods provide a convenient and efficient solution to adjusting the ball joint assembly 10 and rebuilding the ball joint assembly 10 when a component needs to be replaced. The disclosed ball joint assemblies 10 provide an increase of strength of the ball joint assembly 10 without an increase in overall size. The disclosed ball joint assemblies 10 and methods provide improved performance and maintenance.

In some embodiments, the ball joint assembly 10 has no threaded connections in the load path, which may increase the strength of the ball joint assembly 10 and reduce vibration related failure. In some embodiments, the ball joint assembly 10 includes a larger than stock bearing but has the same or similar package as a stock bearing so as to not result in interference with other components. In some embodiments, the ball joint assembly 10 includes a tabbed locking washer to lock a threaded cap to a housing, rather than set screws, thus negating the need to drill additional holes in the components of the ball joint assembly 10. In some embodiments, a bearing in the ball joint assembly 10 is keyed to the housing to prevent rotation of the bearing while it is in the housing. In some embodiments, the ball joint assembly 10 is configured so that the head of the ball stud is inserted into the housing through an opening in the distal end of the housing.

In some embodiments, the ball joint assembly 10 may be adjusted without any disassembly. In some embodiments, the ball joint assembly 10 may be adjusted without any specialized tools. In some embodiments, the ball joint assembly 10 may be rebuilt without removing the portion press fit into the vehicle. These are just some features and functions of the disclosed ball joint assemblies and methods. Other embodiments are contemplated as within the scope of the present disclosure, as discussed in further detail below.

Figure 1A:
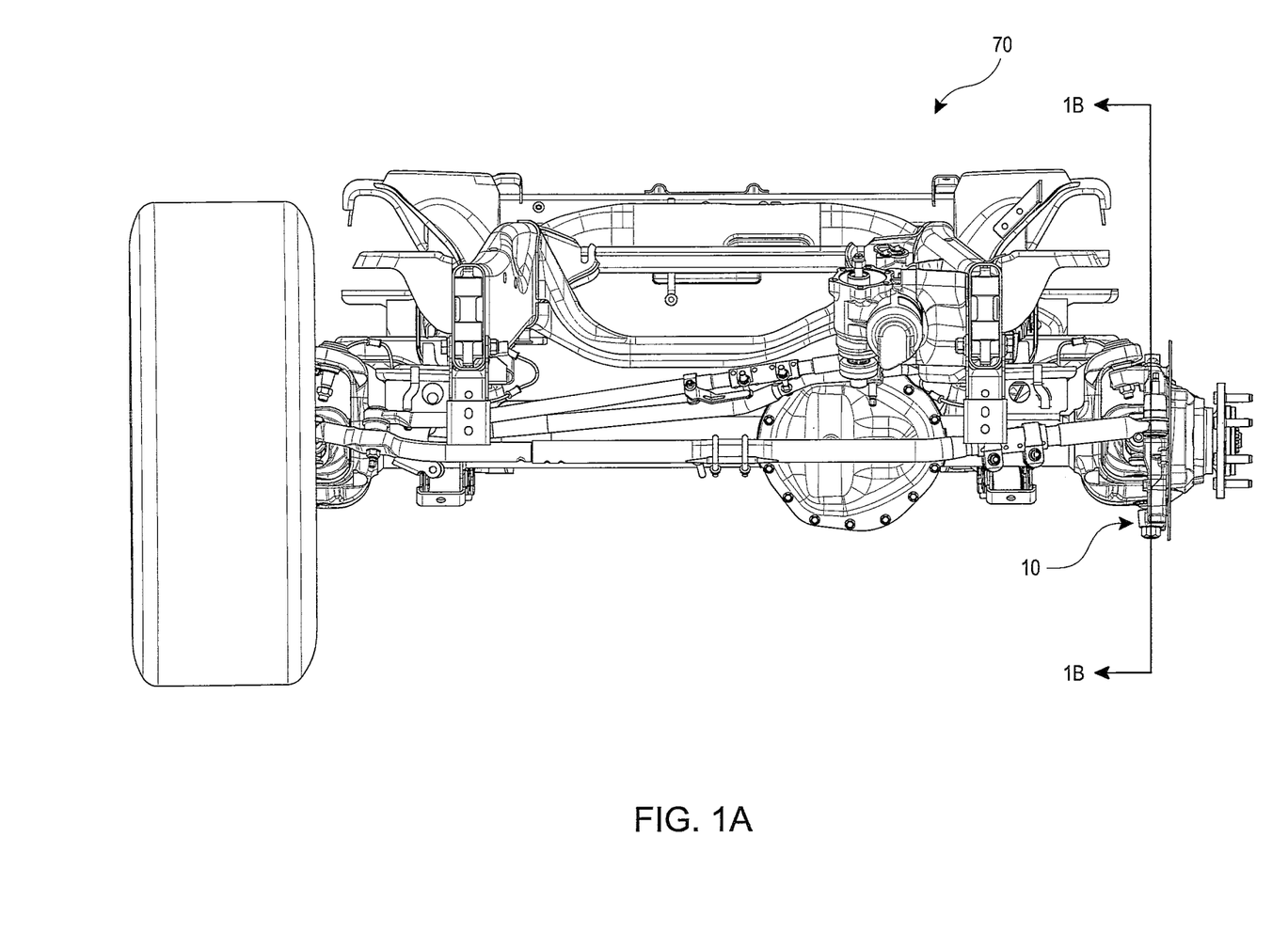
FIG. 1A is a front view of a lower portion of a vehicle with an embodiment of a ball joint assembly installed.
Figure 1B:
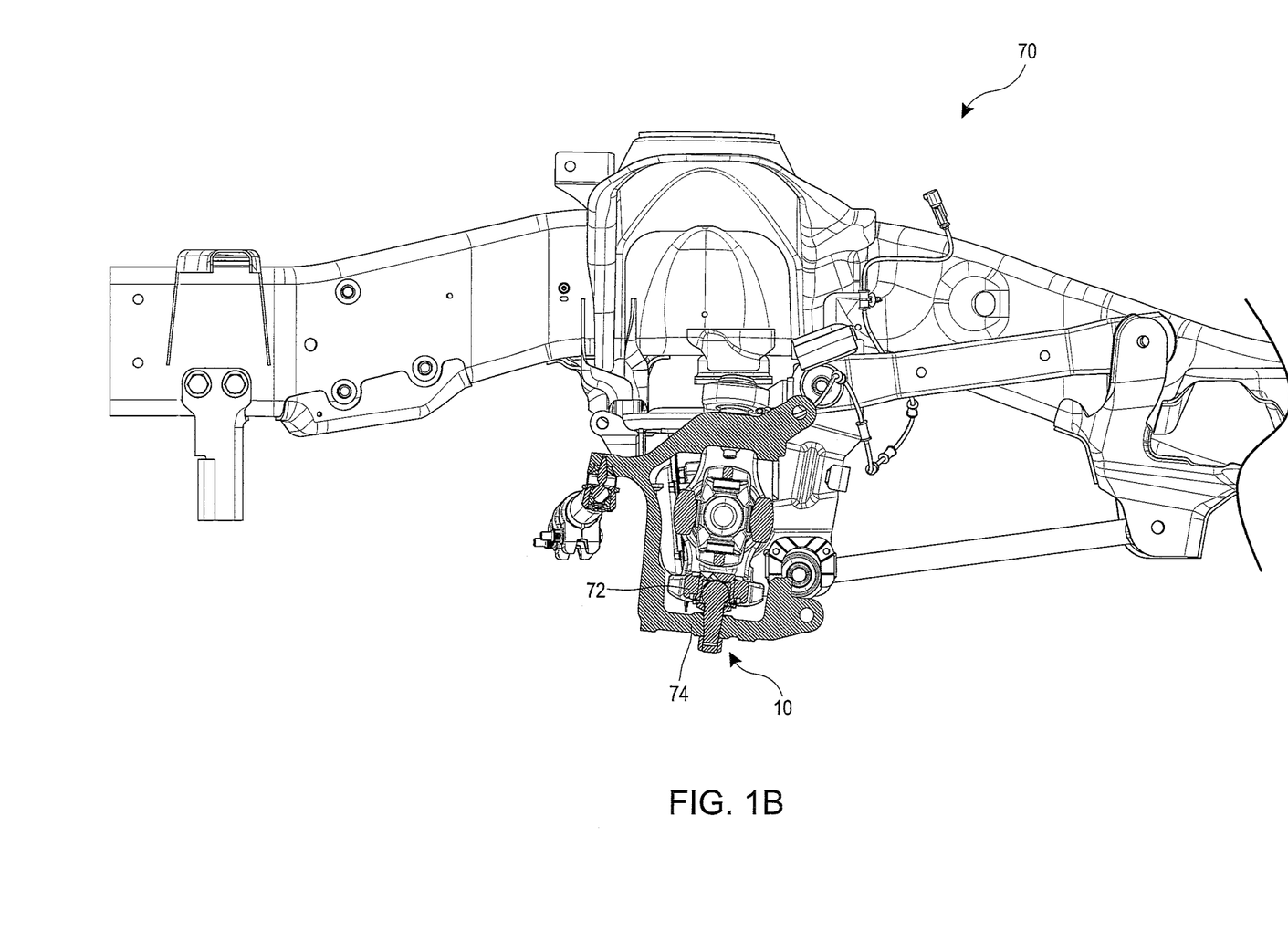
FIG. 1B is a cross-section view of the installed ball joint assembly of FIG. 1A taken along line 1B-1B of FIG. 1A.

Turning to FIG. 1A, a front view of an embodiment of the ball joint assembly 10 installed into a vehicle 70 is shown. The front tire on the right side (looking at the vehicle 70) has been removed to better show the vehicle components. FIG. 1B illustrates a cross-section view taken along line 1B-1B as indicated in FIG. 1A. FIG. 1B shows the ball joint assembly 10 installed in the vehicle 70. As viewed in FIG. 1B, the upper portion of the ball joint assembly 10 is installed in vehicle component 72 and the lower portion of the ball joint assembly 10 is installed in vehicle component 74. In some embodiments, vehicle component 72 may be a steering knuckle, axle housing, tie rod, or control arm and vehicle component 74 may be a control arm, axle housing, tie rod, or steering knuckle.

Figure 2:
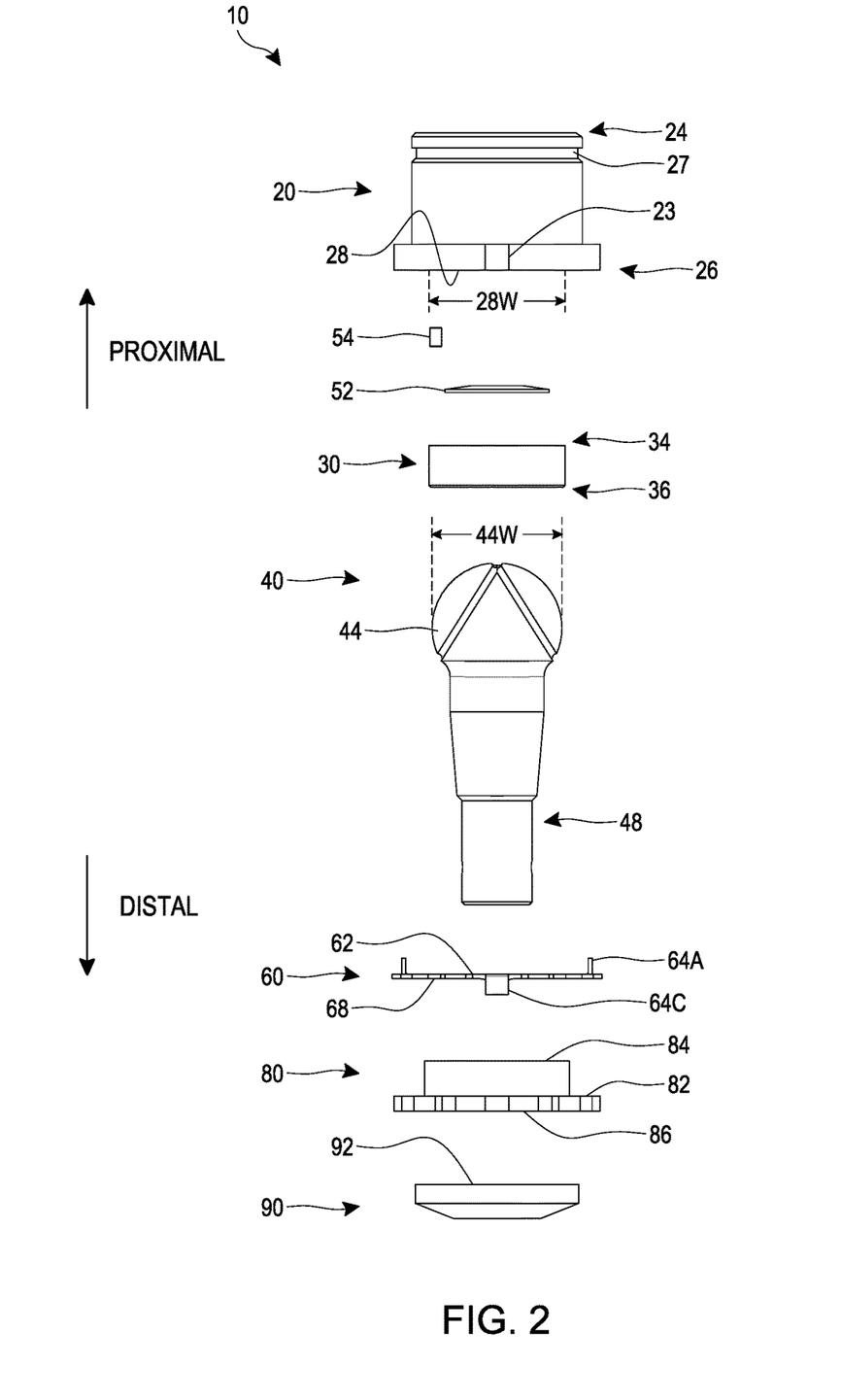
FIG. 2 is an exploded view of the installed ball joint assembly of FIG. 1A.
Figure 3:
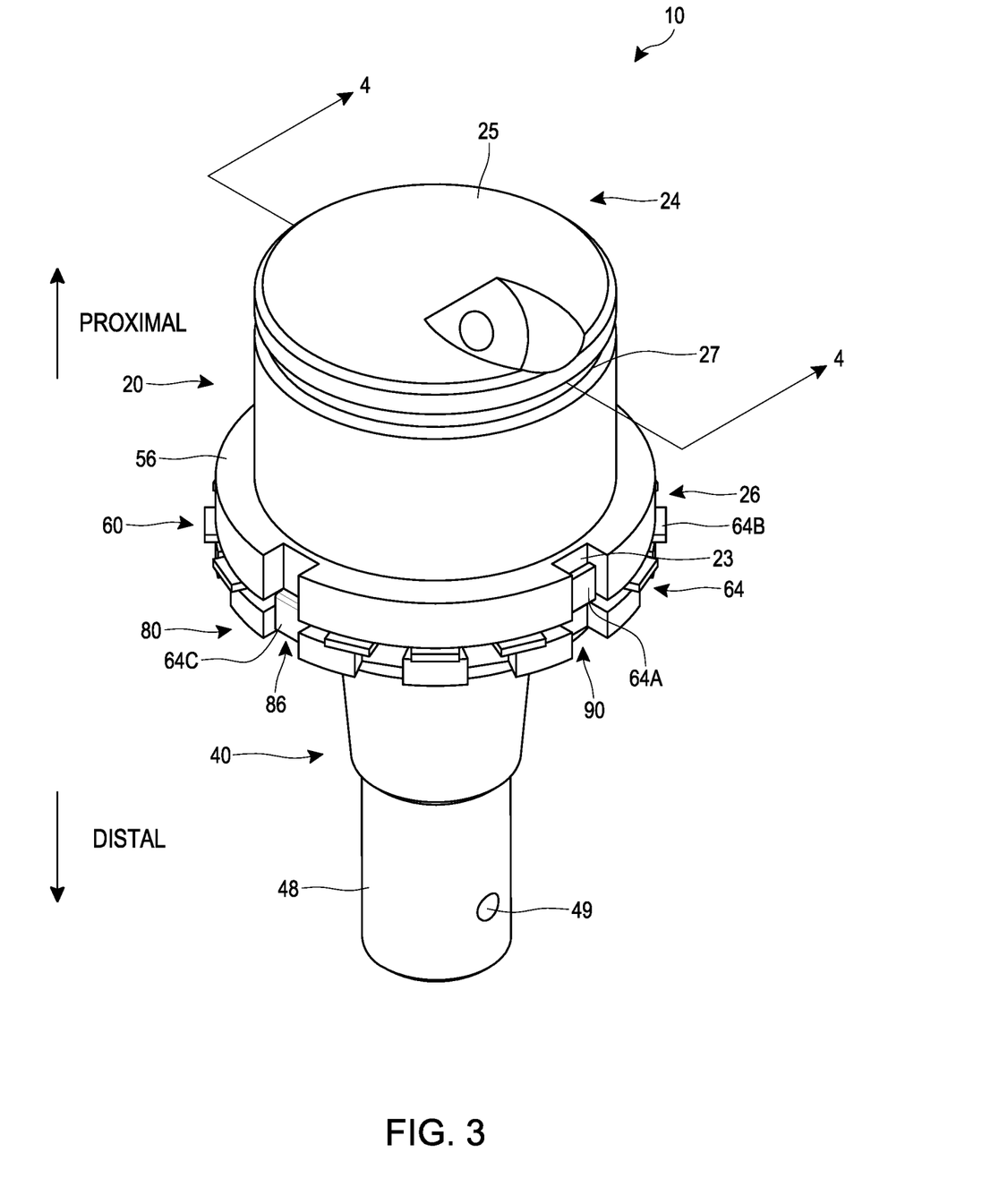
FIG. 3 is a perspective view of the installed ball joint assembly of FIG. 1A.
Figure 4:
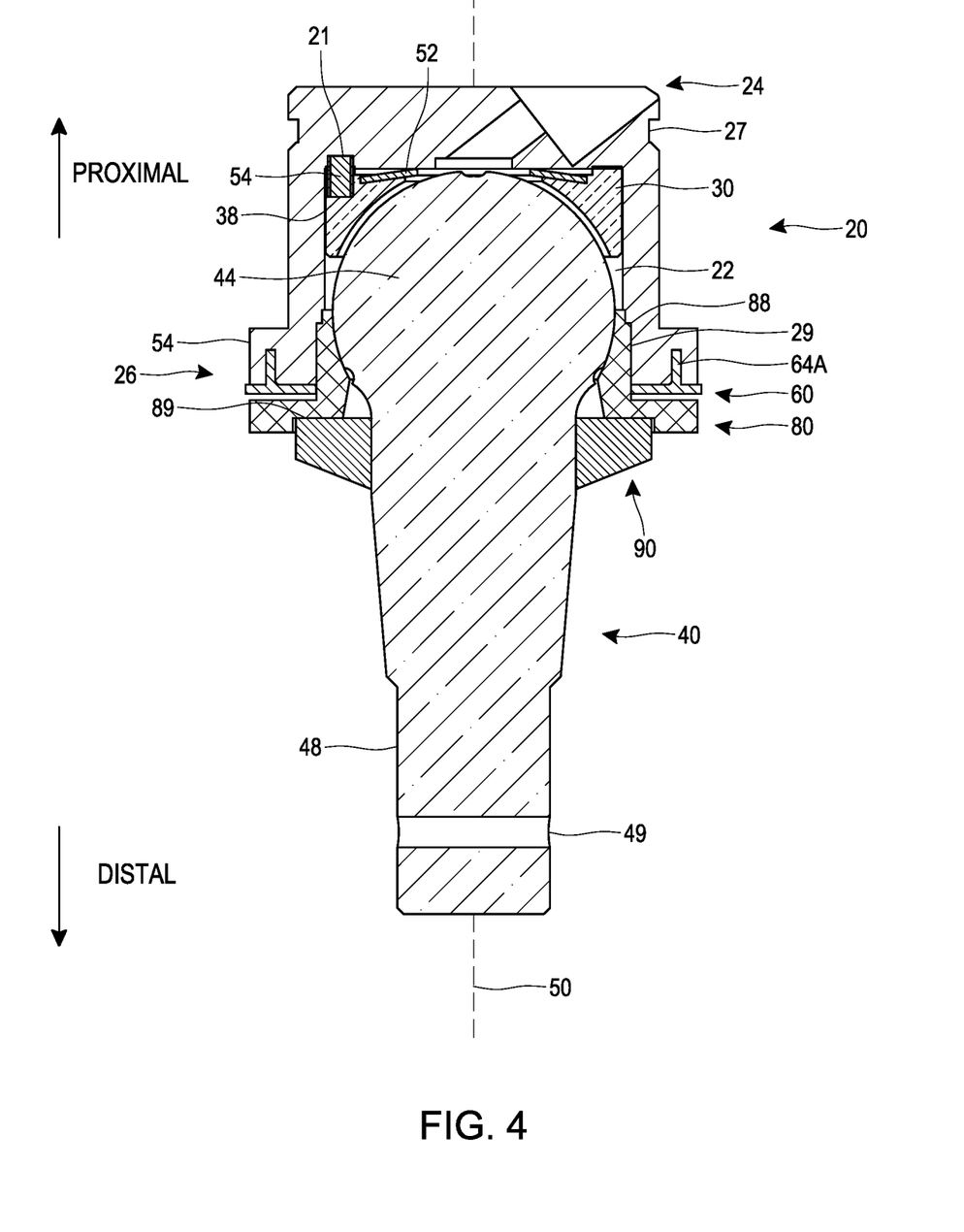
FIG. 4 is a cross-section view of the installed ball joint assembly of FIG. 1A taken along the line 4-4 as indicated in FIG. 3.

Turning to FIGS. 2-4, in FIG. 2 an exploded view of the ball joint assembly 10 is shown. FIG. 3 illustrates a perspective view of the assembled ball joint assembly 10, and FIG. 4 illustrates a cross-section view of the ball joint assembly 10 as taken along the line 4-4 as indicated in FIG. 3. As oriented in FIGS. 2-4, the proximal direction is upwards and the distal direction is downwards. The ball joint assembly may include a housing 20, bearing 30, ball stud 40, and cap 80. In some embodiments, the housing 20 is of steel, plastic, composite material, or other suitable material. In some embodiments, the bearing 30 is of steel, plastic, composite material, or other suitable material. In some embodiments, the ball stud 40 is of steel, plastic, composite material, or other suitable material. In some embodiments, the ball joint assembly further includes a pin 54, compression spring 52, locking washer 60, and/or a boot 90. In some embodiments, the pin 54 is of steel, plastic, composite material, or other suitable material. In some embodiments, the compression spring 52 is of steel, titanium, Inconel, hastelloy, waspaloy, or other suitable material. In some embodiments, the washer 60 is of zinc, aluminum, plastic, steel, or other suitable material. In some embodiments, the boot 90 is of rubber, polyurethane, or other suitable material. As shown in FIG. 4, there is a longitudinal axis 50, which extends in the proximal and distal directions. Longitudinal axis 50 is the principal axis that the ball stud 40 revolves around. The ball stud 40 tilts from longitudinal axis 50 within the housing 20. The ball stud 40 may also move up and down along longitudinal axis 50.

The housing 20 has a proximal end 24 and a distal end 26. The proximal end 24 may have an end wall 25. In some embodiments, the end wall 25 has a recess 21 that engages the pin 54, as shown in FIG. 4 and discussed in further detail below. In some embodiments, the proximal end 24 may have no end wall. In some embodiments, the proximal end 24 of the housing 20 may have an opening in the end wall 25. In some embodiments, the proximal end 24 of the housing 20 is configured to fit into the vehicle component 72. In some embodiments, the housing 20 is configured to be press fit into the vehicle component 72. In some embodiments, the exterior of the housing 20 may include an indentation 27 at the proximal end 24 of the housing 20 configured to engage with the vehicle component 72. The distal end 26 of the housing 20 has an opening 28 that the elongated ball stud 40 may be positioned therethrough. The opening in the distal end of the housing 28 has a width 28W. The housing 20 includes an interior cavity 22, which may extend from the distal opening 28 to the proximal end wall 25. The housing 20 includes a threaded portion 29, which engages with a threaded portion 88 of the cap 80. In some embodiments, the distal end 26 of the housing 20 may include a lip 56. The lip 56 may have one or more slots 23 that are configured to receive portions of the washer 60, as discussed in more detail below. In some embodiments, the lip 56 may have no slots. In other embodiments, the lip 56 may have flat portions, e.g. a radially inward recess, configured to engage portions, such as tabs, of the washer 60. In some embodiments, the housing 20 may have a constant width from the proximal end 24 to the distal end 26. In some embodiments, the housing 20 may have an increasing or decreasing width from the proximal end 24 to the distal end 26.

As shown in FIG. 2, the bearing 30 has a proximal portion 34 and a distal portion 36. The distal portion 36 may rotate relative to the proximal portion 34. As shown in FIG. 4, the bearing 30 is positioned within the cavity of the housing 22. The distal portion of the bearing 36 is configured to receive and support the head 44 of the elongated ball stud 40. The bearing 30 allows the elongated ball stud 40 to rotate around the longitudinal axis 50. The bearing 30 reduces the amount of friction between the housing 20 and the head of the ball stud 44. The surface of the distal portion 36 is preferably complementarily shaped to the surface of the head of the ball stud and the surfaces engage one another. In some embodiments, the bearing 30 may adapt for looseness between the ball stud 40 and the housing 20 resulting from wear. The proximal portion 34 is positioned adjacent to the proximal end wall of the housing 25. In some embodiments, as shown in FIG. 4, the proximal portion of the bearing 34 may include a depression 38 in which a portion of the pin 54 may sit. As shown in FIG. 4, the pin 54 may be positioned within the cavity of the housing 22 and engage the recess 21 in the proximal wall of the housing 25. The pin 54 may also engage the depression 38 in the proximal portion of the bearing 34. The pin 54 restrains the rotation of the proximal portion of the bearing 34 relative to the housing 20. In some embodiments, in addition or alternatively to the pin 54, another mechanism for restraining rotation may be used. In some embodiments, the pin 54 may be integral with the housing 20 or the bearing 30. In other embodiments, the bearing 30 is not restrained from rotating in the housing 20.

In some embodiments, a compression spring 52 is positioned in the cavity 22 of the housing 20 between the proximal end wall 25 and the bearing 30. In some embodiments, the compression spring 52 is a Bellville washer. The compression spring 52 provides an axial distal force on the bearing 30.

As shown in FIG. 2, the elongated ball stud 40 has a head 44 and shank 48. The head 44 has a maximum width 44W. The head 44 may be generally spherical, hemispherical, cylindrical, or another shape that permits rotation. The head width 44W is less than the width 28W of the opening 28 in the distal end 26 of the housing 20 such that the head 44 can move therethrough for assembly. As shown in FIG. 4, the head is positioned in the cavity 22 of the housing 20 and is received by the bearing 30. The shank 48 may be configured to engage a vehicle component 74. In some embodiments, the shank 48 may have threads. In some embodiments, the shank 48 is not threaded. In some embodiments the shank 48 may have a hole 49 passing therethrough configured to receive a locking mechanism, such as a pin As shown in FIG. 2, the cap 80 has a body 82 and an opening 84. The cap opening 84 is configured so that the ball stud 40 can pass therethrough. In some embodiments, as shown in FIG. 4, the cap 80 engages the housing 20 via threads 88. The cap threads 88 mate with the threaded portion 29 of the housing 20. The cap 80 may be tightened via the threads 88 to establish a compression load on the ball stud 40. The cap 80 may be loosened via the threads 88 to reduce or remove the compression load on the ball stud 40. In some embodiments, the cap 80 may be configured to tighten incrementally. In some embodiments, the cap 80 has one or more notches 86, which are configured to engage with a portion, e.g., tab, of the washer 60, as discussed in more detail below. In some embodiments, the cap 80 may have no notches. In some embodiments, the cap 80 may have flat portions configured to engage portions of the washer 60. In some embodiments, the cap 80 may have a groove 89 to receive the boot 90.

The boot 90 has an opening 92, which is configured so that the ball stud 40 can pass therethrough. The boot 90 seals the ball joint assembly 10 and prevents dirt and debris from entering the joint 10. The boot 90 sits adjacent to the cap 80.

In some embodiments, the ball joint assembly 10 includes a washer 60. The washer has a body 68 and an opening 62, which is configured for the ball stud 40 to pass therethrough. In some embodiments, the washer 60 has one or more tabs 64 away extending from the body 68. There may be one or more tabs 64 extending away from the body 68. The tabs 64 may be flexible. The washer 60 may have one or more tabs 64A, 64B, 64C that are moveable between a first configuration, in which the tab engages the housing 20 and restrains rotation of the washer 60 relative to the housing 20, a second configuration, in which the tab does not engage the housing 20 and allows rotation of the washer 60 relative to the housing 20, and a third configuration, in which the tab engages the cap 80 and restrains rotation of the cap 80 relative to the washer 60. As shown in FIGS. 2 and 3, the tab 64A is in the first configuration, bent in the proximal direction to engage the housing 20, the tab 64B is in the second configuration, extending away from the washer body 68 and not engaging the housing 20, and the tab 64C is in the third configuration, bent in the distal direction to engage the cap 80. The tab 64A is configured to engage with the slot 23 in the housing 20. In other embodiments, the tab 64A may be configured to engage with another portion of the housing 20, for example, a flat portion. In some embodiments, the washer 60 may be rotated so that the tab 64A is adjacent to the slot 23. The tab 64C is configured to engage with the notch 86 in the cap 80. In some embodiments, the tab 64C may be configured to engage with another portion of the cap 80, for example a flat portion. In some embodiments, the washer 60 may be rotated so that the tab 64C is adjacent to the notch 86.

In some embodiments, the washer 60 may have one or more tabs that are permanently in the first configuration and not moveable to a second configuration. In such embodiments, the washer 60 is positioned so that the tab permanently in the first configuration engages the housing 20 and restrains the rotation of the washer 60 relative to the housing 20. In such embodiments, to allow rotation of the washer relative to the housing, the washer will need to be removed from the housing 20 so that the tab is no longer engaging the housing.

In some embodiments, the housing 20 and/or the cap 80 may have tabs that are moveable between a first configuration that restrains the rotation of the cap 80 relative to the housing 20 and a second configuration that allows rotation of the cap 80 relative to the housing 20, thus not requiring the washer 60. In other embodiments, the rotation of the cap 80 relative to the housing 20 may be restrained using set pins or another known locking mechanism.

Figure 5:
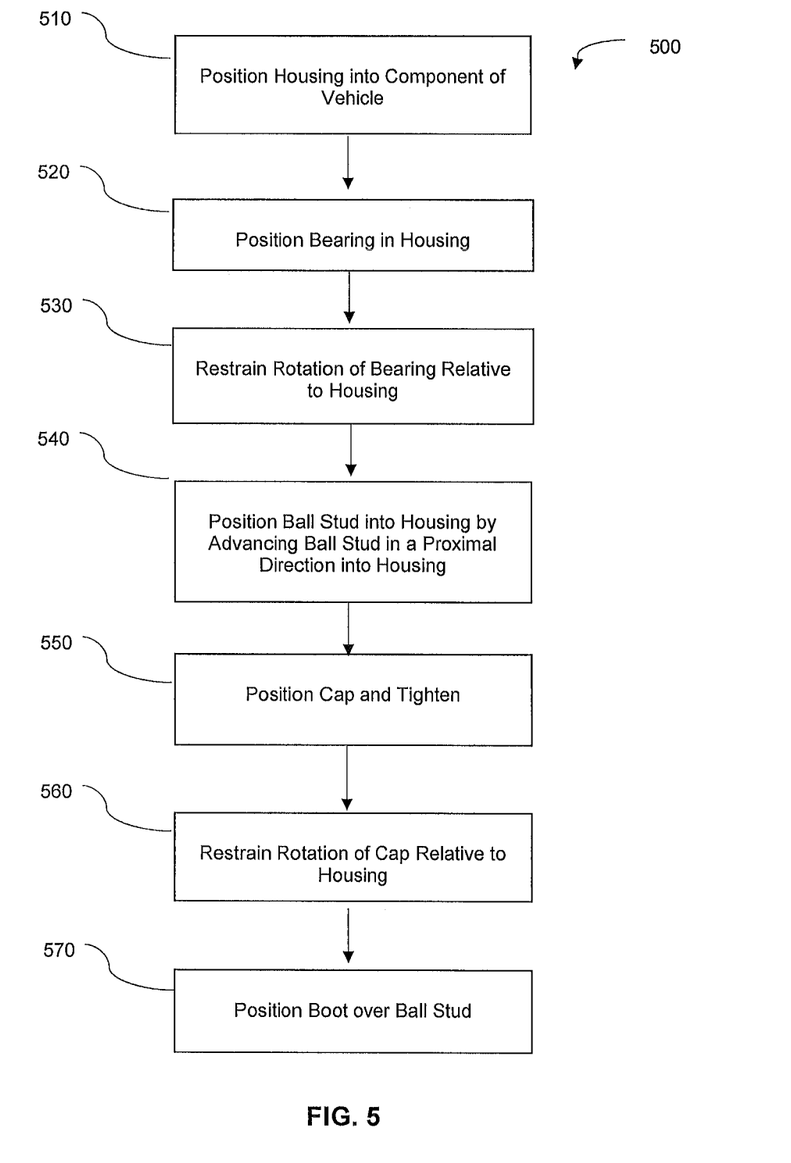
FIG. 5 is a flowchart depicting an embodiment of a method of installing a ball joint assembly.

FIG. 5 is a flowchart illustrating an exemplary method 500 for installing a ball joint assembly into a vehicle. The method 500 may be used with the ball joint assembly 10 of FIGS. 1-4. The method 500 may begin with the step 510. Step 510 includes positioning a housing of the ball joint assembly into a component of the vehicle. In some embodiments, the housing may be positioned into suspension and steering system for a front wheel of a vehicle, for example, a steering knuckle, axle housing, or control arm. Step 510 may include positioning the housing 20 into the vehicle component 72. In some embodiments, step 510 may include press fitting housing 20 into vehicle component 72.

The method 500 may then move to step 520. Step 520 includes positioning a bearing into the housing. For example, step 520 may include positioning the bearing 30 into housing 20. In some embodiments, step 520 may further include positioning a compression spring between the bearing and the housing. For example, the compression spring 52 and bearing 30 may be positioned into the cavity 22 of the housing 20.

The method 500 may then move to step 530. Step 530 includes restraining the rotation of the bearing relative to the housing. In some embodiments, step 530 includes using a pin to restrain rotation about a longitudinal axis of the bearing relative to the housing. For example, step 530 may include positioning the pin 54 to engage the housing recess 21 and bearing depression 38 to restrain rotation of the proximal portion 34 of the bearing 30 about longitudinal axis 50 relative to the housing 20. In other embodiments, another locking mechanism may be used to prevent rotation of the bearing relative to the housing. In some embodiments of method 500, step 530 is not performed. For example, the rotation of the bearing relative to the housing may not be restrained.

The method 500 may then move to step 540. Step 540 includes positioning a ball stud into the housing by advancing the ball stud in a proximal direction into the housing. For example, step 540 may include positioning the head 44 of the ball stud 40 in the cavity 22 of the housing 20 through the distal opening 28 with the shank 48 extending away from the housing 20 in the distal direction. The head 44 of the ball stud 40 interacts with the bearing 30 and the ball stud 40 is able to rotate about the longitudinal axis 50.

The method 500 may then move to step 550. Step 550 includes positioning a cap and tightening. For example, step 550 may include positioning the cap 80 over the ball stud 40 and engaging the threads 88 of the cap 80 with the threaded portion 29 of the housing 20. Step 550 may include rotating the cap 80 to increase a load on the bearing 30. Step 550 may include tightening the cap 80 incrementally.

The method 500 may then move to step 560. Step 560 includes restraining rotation of the cap relative to the housing. For example, step 560 may include using washer 60 with one or more tabs 64 to engage the housing 20 and the cap 80 to restrain rotation of the cap 80 about the longitudinal axis 50 relative to the housing. In some embodiments, step 560 may include engaging tab 64A with slot 23 of the housing and engaging tab 64C with notch 86 of the cap. In some embodiments, step 560 may include bending one or more tabs 64 in the proximal direction and one or more tabs 64 in the distal direction. In some embodiments, step 560 may include using set screws to restrain rotation of the cap relative to the housing.

The method 500 may then move to step 570. Step 570 includes positioning a boot over ball stud. For example, step 570 may include positioning the opening of the boot 92 over the ball stud 40. In some embodiments, step 570 may include positioning boot 90 in a groove of the cap 89 to prevent debris from entering the joint assembly 10.

The steps in method 500 may be performed in various orders, for example, step 520 and 530 may be performed before step 510. In some embodiments, steps 520-570 may be performed before step 510.

Figure 6:
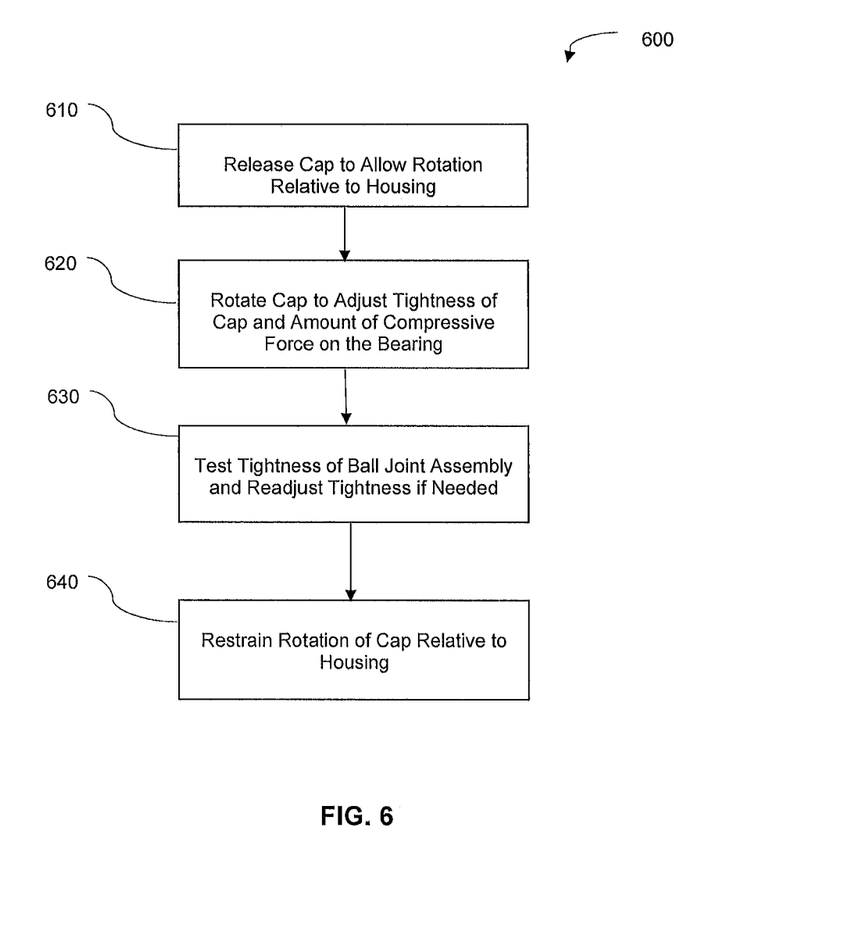
FIG. 6 is a flowchart depicting an embodiment of a method of adjusting a ball joint assembly.

FIG. 6 is a flowchart illustrating an exemplary method 600 for adjusting a ball joint assembly, such as the ball joint assembly 10. In some embodiments, method 600 may be done while the ball joint assembly is positioned on the vehicle. In some embodiments, method 600 is performed where there is excessive looseness or play in the ball joint assembly. In some embodiments, method 600 is performed when there is excessive tightness in the ball joint assembly.

The method 600 may begin with the step 610. Step 610 includes releasing the cap to allow rotation of the cap relative to the housing. For example, step 610 may include disengaging washer tab 64C from notch in the cap 86, thus allowing cap 80 to rotate relative to the housing 20. In some embodiments, step 610 may include disengaging washer tab 64A from slot in housing 23. In some embodiments, step 610 may include bending one or more tabs 64 to extend radially outward. In other embodiments, step 610 may include removing set screws.

The method 600 may then move to step 620. Step 620 includes rotating cap to adjust tightness of cap and amount of compressive force on the bearing. For example, step 620 may include rotating cap 80 to increase the compressive force on bearing 30. Step 620 may include engaging the threads of the cap 88 with the threaded portion of the housing 29. In some embodiments, the cap 80 may be rotated incrementally. In some embodiments, step 620 may include rotating cap 80 to decrease the compressive force on bearing 30.

The method 600 may then move to step 630. Step 630 includes testing tightness of ball joint assembly and readjust tightness if needed. For example, step 630 may include testing the tightness of ball joint assembly 10 installed in vehicle component 72 by hand. In some embodiments, step 630 may include testing the tightness of ball joint assembly 10 by machine. Step 630 may include repeating step 620 if further adjustment is needed.

The method 600 may then move to step 640. Step 640 includes restraining rotation of cap relative to housing. For example, step 640 may include engaging washer tab 64C with notch of the cap 86. In some embodiments, step 640 may include engaging washer tab 64A with slot of housing 23. In some embodiments, step 640 may include bending one or more tabs 64 in the proximal direction and one or more tabs 64 in the distal direction. In other embodiments, step 640 may include placing set screws.

Figure 7:
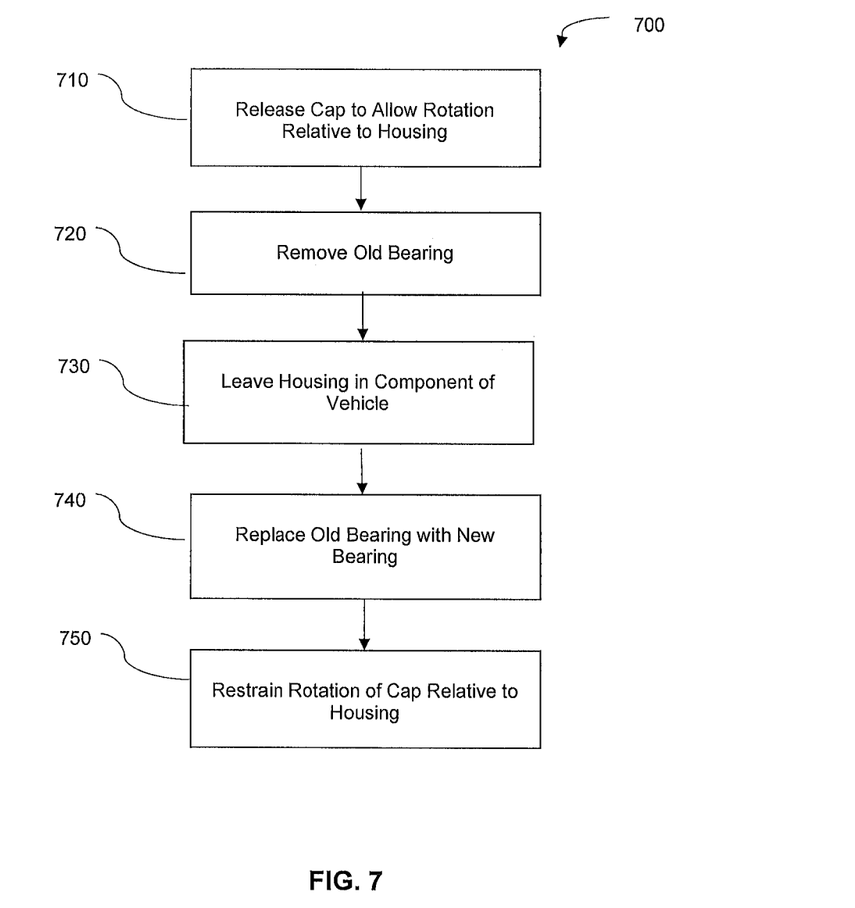
FIG. 7 is a flowchart depicting an embodiment of a method of replacing a bearing or other component in a ball joint assembly.

FIG. 7 is a flowchart illustrating an exemplary method 700 for replacing a worn component of a ball joint assembly, such as ball joint assembly 10. In some embodiments, method 700 is performed while the ball joint assembly is positioned on the vehicle. In some embodiments, method 700 is performed when the bearing needs to be replaced.

The method 700 may begin with step 710. Step 710 includes releasing cap to allow rotation relative to housing. For example, step 710 may include disengaging washer tab 64C from notch 86 in the cap 80, thus allowing cap 80 to rotate relative to the housing 20. In some embodiments, step 710 may include disengaging washer tab 64A from slot 23 in housing 20. In some embodiments, step 710 may include bending one or more tabs 64 to extend radially outward. In other embodiments, step 710 may include removing set screws.

The method 700 may then move to step 720. Step 720 includes removing an old bearing. For example, step 720 may include removing bearing 30, boot 90, cap 80, washer 60, and ball stud 40 from housing 20. In some embodiments, step 720 may further include removing compression spring 52 and or pin 54.

The method 700 may then move to step 730. Step 730 includes leaving housing in component of vehicle. For example, step 730 may include leaving housing 20 in vehicle component 72. In some embodiments, housing 20 is press fit in vehicle component 72. Repeated removal and replacement of a housing may damage vehicle component 72.

The method 700 may then move to step 740. Step 740 includes replacing old bearing with new bearing. For example, step 740 may include placing a new bearing 30 in housing cavity 22. Step 740 may further include repositioning the ball stud 40, washer 60, cap 80, and boot 90. In some embodiments, step 740 may further include placing a new pin 54 and/or new compression spring 52 in the housing cavity 22 before replacing the bearing 30.

The method 700 may then move to step 750. Step 750 includes restraining rotation of cap relative to housing. For example, step 750 may include engaging washer tab 64C with notch 86 of the cap 80. In some embodiments, step 750 may include engaging washer tab 64A with slot of housing 23. In some embodiments, step 750 may include bending one or more tabs 64 in the proximal direction and bending one or more tabs 64 in the distal direction. In other embodiments, step 750 may include placing set screws.

Figure 8:
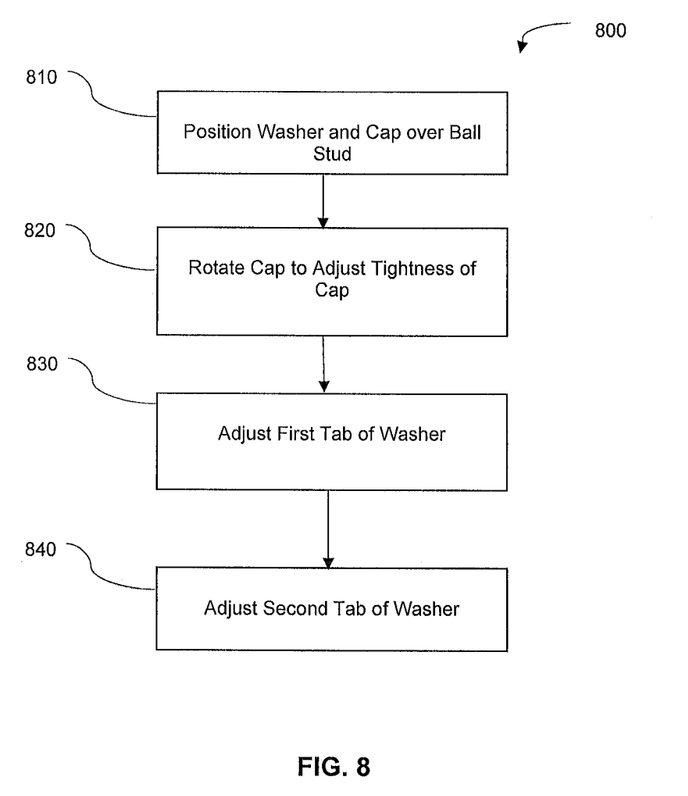
FIG. 8 is a flowchart depicting an embodiment of a method of rebuilding a ball joint assembly.

FIG. 8 is a flowchart illustrating an exemplary method 800 for rebuilding a ball joint assembly having a housing engaged with a vehicle component, such as ball joint assembly 10. In some embodiments, method 800 is performed after replacing a component of the ball joint assembly, such as a bearing or a ball stud. In some embodiments, method 800 may be performed on a housing 20 engaged with vehicle component 72. In some embodiments, method 800 is performed after replacing a component of the ball joint assembly, such as a bearing or a ball stud.

The method 800 may begin with step 810. Step 810 includes positioning a washer and a cap over a ball stud. For example, step 810 may include positioning the washer 60 and the cap 80 over the ball stud 40. In some embodiments, step 810 may include positioning the washer 60 and the cap 80 over the ball stud 40 at the distal end of the housing 20.

The method 800 may then move to step 820. Step 820 includes rotating the cap to adjust tightness of cap. For example, step 820 may include rotating the cap 80. In some embodiments, step 820 may include rotating the cap 80 to increase a compressive force on the ball stud 40. In some embodiments, step 820 may include rotating the cap 80 to decrease the compressive force on the ball stud 40. In some embodiments, step 820 may include rotating the cap 80 to increase and decrease the compressive force on the ball stud 40 to achieve the desired tightness of the ball joint assembly 10, e.g. the ball stud's 40 ability to rotate about axis 50.

The method 800 may then move to step 830. Step 830 includes adjusting a first tab of washer. For example, step 830 may include adjusting a tab 64 of washer 60 to the first configuration 64A to rotationally restrain washer 60 relative to the housing 20. In some embodiments, step 830 may include bending a tab 64 in the proximal direction. In some embodiments, step 830 may include bending a tab 64 to engage slot 23 of housing 20, such as the position of tab 64A. In some embodiments, step 830 may include bending a tab 64 to engage a flat portion of housing 20. In some embodiments, method 800 may include rotating the washer 60 so that a tab 64 aligns with a slot 23 or flat portion of the housing 20.

The method 800 may then move to step 840. Step 840 includes adjusting a second tab of the washer. For example, step 840 may include adjusting a tab 64 of washer 60 to the third configuration 64C to rotationally restrain the washer 60 relative to the cap 80. In some embodiments, step 840 may include bending a tab 64 in the distal direction. In some embodiments, step 840 may include bending a tab 64 to engage notch 86 of cap 80, such as the position of tab 64C. In some embodiments, step 840 may include bending second tab 64 to engage a flat portion of cap 80. In some embodiments, step 840 may include rotating the washer 60 so that a tab 64 aligns with a notch 86 or flat portion of the cap 80.

In some embodiments, the method 800 may further include advancing the ball stud in a proximal direction into the housing prior to step 810. For example, the method 800 may include advancing the ball stud 40 in a proximal direction into the housing 20 prior to positioning the washer 60 and the cap 80 over the ball stud 40. In some embodiments, the ball stud 40 is advanced through the opening 28 of the distal end 26 of the housing 20 into the cavity 22 of the housing 20. In some embodiments, the head 44 of the ball stud 40 is advanced into a distal portion 36 of the bearing 30. In some embodiments, the method 800 may further include advancing the ball stud in a distal direction out of the housing prior to advancing the ball stud in the proximal direction into the housing. For example, the method 800 may include advancing the ball stud 40 in a distal direction out of the housing 20 prior to advancing the ball stud 40 in the proximal direction into the housing 20.

In some embodiments, the method 800 may further include removing a first bearing in a distal direction out of the housing prior to positioning the washer and the cap over the ball stud. For example, the method 800 may include removing a first bearing 30 in a distal direction out of the housing 20 prior to positioning the washer 60 and the cap 80 over the ball stud 40. In some embodiments, the method 800 may further include advancing a second bearing in a proximal direction into the housing after removing the first bearing and prior to positioning the washer and the cap over the ball stud. For example, the method 800 may include advancing a second bearing 30 in a proximal direction into the housing 20 after removing the first bearing 30 and prior to positioning the washer 60 and the cap 80 over the ball stud 40. In some embodiments, the first bearing may be worn, defective, or old and the second bearing may be new.

The steps in method 800 may be performed in various orders, for example, step 840 may be performed before step 830. In some embodiments, step 830 or step 840 may be performed before step 820.

The flowchart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

The foregoing description details certain embodiments of the assemblies and methods disclosed herein. It will be appreciated, however, that no matter how detailed the foregoing appears in text, the assemblies and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method of installing a lower ball joint assembly into a vehicle comprising:
    positioning a housing into a component of the vehicle, the housing defining a cavity and a longitudinal axis and comprising a distal end and a proximal end, the distal end comprising an opening;
    positioning a bearing in the cavity of the housing;
    advancing a ball stud proximally into the cavity of the housing such that the bearing rotatably supports the ball stud;
    positioning a cap over the ball stud and engaging the cap with the housing; and
    restraining rotation of the cap relative to the housing, wherein restraining rotation of the cap relative to the housing comprises:
        positioning a washer distal to the housing and proximal to the cap, the washer comprising a first tab and a second tab;
        bending the first tab of the washer proximally into a slot of the housing to rotationally restrain the washer relative to the housing; and
        bending the second tab of the washer distally into a notch of the cap to rotationally restrain the washer relative to the cap.

2. The method of claim 1, wherein positioning the housing into the component of the vehicle comprises press fitting the housing into the component of the vehicle.

3. The method of claim 1, further comprising restraining rotation of a proximal portion of the bearing relative to the housing.

4. The method of claim 3, wherein restraining rotation of the proximal portion of the bearing comprises engaging a pin with the housing and the proximal portion of the bearing.

5. The method of claim 1, further comprising adjusting a compressive force on the bearing.

6. The method of claim 5, wherein adjusting the compressive force on the bearing comprises rotating the cap in a first direction to increase the compressive force on the bearing and rotating the cap in a second direction to decrease the compressive force on the bearing.

7. The method of claim 1, further comprising installing the lower ball joint assembly with a tie rod of the vehicle.

8. The method of claim 1, further comprising installing the lower ball joint assembly with a control arm for a suspension system of the vehicle.

9. The method of claim 1, wherein the washer comprises a body, and the first tab and the second tab extend away from the body.

* * * * *

UNITED STATES PATENT AND TRADEMARK OFFICE
CERTIFICATE OF CORRECTION

| | | |
|---|---|---|
| PATENT NO. | : 12,378,990 B2 | |
| APPLICATION NO. | : 17/965205 | |
| DATED | : August 5, 2025 | |
| INVENTOR(S) | : Andrew J. Smith | |

It is certified that error appears in the above-identified patent and that said Letters Patent is hereby corrected as shown below:

In the Specification

In Column 1, Line 10, delete "continuation of" and insert --divisional of--.

In Column 8, Line 61, delete "as a pin" and insert --as a pin.--.

In Column 12, Line 4, delete "52 and or pin" and insert --52 and/or pin--.

Signed and Sealed this
Eleventh Day of November, 2025

John A. Squires
*Director of the United States Patent and Trademark Office*